US005630092A

United States Patent [19]

Carreiro et al.

[11] Patent Number: 5,630,092
[45] Date of Patent: May 13, 1997

[54] SYSTEM AND METHOD FOR TRANSFERRING COMPRESSED AND UNCOMPRESSED DATA BETWEEN STORAGE SYSTEMS

[75] Inventors: Paul P. Carreiro; Robert R. Fish, both of San Jose; David R. Nowlen, Morgan Hill, all of Calif.

[73] Assignee: International Business Machines, Armonk, N.Y.

[21] Appl. No.: 581,719

[22] Filed: Jan. 2, 1996

Related U.S. Application Data

[63] Continuation of Ser. No. 326,407, Oct. 20, 1994, abandoned.
[51] Int. Cl.⁶ .............. G06F 12/02; G06F 13/00
[52] U.S. Cl. .............. 395/438; 364/DIG. 1; 364/DIG. 2; 364/715.02; 364/951.3; 395/888
[58] Field of Search .............. 395/404, 431, 395/438, 439, 600, 888; 364/DIG. 1, DIG. 2, 404, 431, 438, 439, 600, 715.02, 951.3

[56] References Cited

U.S. PATENT DOCUMENTS

| | | | |
|---|---|---|---|
| 4,814,746 | 3/1989 | Miller et al. | 341/600 |
| 4,929,946 | 5/1990 | O'Brien et al. | 341/87 |
| 5,087,913 | 2/1992 | Eastman | 341/95 |
| 5,226,156 | 7/1993 | MacLean, Jr. et al. | 395/600 |
| 5,237,675 | 8/1993 | Hannon, Jr. | 395/425 |
| 5,247,646 | 9/1993 | Osterlund et al. | 395/425 |
| 5,262,875 | 11/1993 | Mincer | 358/335 |
| 5,274,805 | 12/1993 | Ferguson et al. | 395/600 |
| 5,280,600 | 1/1994 | Van Maren et al. | 395/425 |
| 5,313,604 | 5/1994 | Godwin | 395/425 |
| 5,357,614 | 10/1994 | Pattisam et al. | 395/250 |
| 5,392,445 | 2/1995 | Takamoto et al. | 395/800 |
| 5,394,534 | 2/1995 | Kulakowski et al. | 395/425 |
| 5,463,772 | 10/1995 | Thompson et al. | 395/600 |
| 5,481,701 | 1/1996 | Chambers, IV | 395/600 |

*Primary Examiner*—Tod R. Swann
*Assistant Examiner*—Tuan V. Thai
*Attorney, Agent, or Firm*—Esther E. Klein

[57] ABSTRACT

A system and method are provided for sharing a data stream between a first data storage system in communication with a second data storage system. Meta-data is associated with each record of the data stream. Zero or more records of the data stream are compressed at the first storage system. The meta-data for the compressed data record is updated to indicate that the data record has been compressed. The data stream including the compressed data record with the updated meta-data is sent to the second storage system. The meta-data and the data stream records are stored on a storage device at the second data storage system.

7 Claims, 8 Drawing Sheets

| TABLE 1. | RD_Element |
|---|---|
| Byte(s) | Usage |
| 0 — 4 | Count_Field_CCHHR |
| 5 | Count_Field_KL/Transfer_Length_2 |
| 6 — 7 | Count_Field_DLDL/Transfer_Length_3 |
| 8 — 9 | Reserved |
| 10 — 11 | Flags |
| 12 — 13 | Field_2_Length |
| 14 — 15 | Field_3_Length |
| 16 | Field_Descriptor_1_Flags |
| 17 | Field_Descriptor_2_Flags |
| 18 | Field_Descriptor_3_Flags |
| 19 — 20 | Reserved |
| 21 — 23 | Reserved |
| 24 — 25 | Reserved |
| 26 | Transfer_Length_1 |
| 27 | Reserved |
| 28 — 31 | Data Buffer Address |

FIG. 4

SYSTEM AND METHOD FOR TRANSFERRING COMPRESSED AND UNCOMPRESSED DATA BETWEEN STORAGE SYSTEMS

This application is a continuation of Ser. No. 08/326,407, filed Oct. 20, 1994, now abandoned.

FIELD OF THE INVENTION

This invention relates to storage systems and more particularly to a system and method for transferring compressed data between storage subsystems.

BACKGROUND OF THE INVENTION

Data processing centers are often burdened with having to perform various time-consuming computer processing operations in order to maintain data availability in the event of equipment failures or natural disasters.

For example, dump/restore operations back up large amounts of data stored on direct access storage devices (DASD) to tape devices. Operations to off-load data to tape are typically performed at off-prime shift hours because of the time requirement for the operation.

Data Mirroring is another method used for maintaining high data availability where a second copy of updated data is automatically copied to a backup DASD system. Many installations use on-the-fly creation of backup copies for critical databases during the prime shift operations. The backup copies can advantageously be located physically removed from the primary storage device. This process is referred to as Extended Distance Dual Copy. With dual copy, as with the dump/restore operations, the time required to copy the data from the primary storage media to the backup volume can be critical. There is a need to minimize the time required for these operations.

A control unit, also referred to as a storage subsystem or storage unit, includes a controller and is connected to one or more storage devices, such as disk files or tape drives as well as to a host central processing unit (CPU) system. An example of a disk control unit is the IBM 3990 Series controller. The disk files are also referred to as Head Disk Assemblies (HDAs). The HDAs contain the actual data storage hardware. The controller provides the external computer interface for the subsystem. Each HDA contains one or more platters or disks on which data is recorded. The data is written in concentric circles on the disks, which are called tracks. The user data can be written and read from the host computer issuing commands. The HDA and storage subsystem may be packaged together or separately.

The data on the tracks are organized according to a set of rules which are typically fixed in the design of the disk system. For example, the design of the disk system may require that the data be written in fixed length record or allow for variable length records. A well-known technique for writing and reading variable length records is referred to as Count Key Data (CKD) format. The tracks are grouped to form cylinders.

The CKD format is used on many computers such as the IBM System/390 CPUs and attached external storage devices. The CKD format operates under many operating systems such as the well known IBM MVS operating environment. A CKD record consists of count, key and data fields. The count field defines the location of the record and the length of the key and data fields. The key field serves as a record identifier, when used. The data field contains the actual data stored in the record. A track can store zero, one or many records of various lengths.

In general, data records are transmitted between host and storage subsystems over communication attachment interface architectures such as IBM ESCON, IBM OEMI protocol channels, or Small Computer Systems Interface (SCSI). Peer-to-peer or channel-to-channel communication links well known in the field, such as the channel-to-channel interface on the IBM System/370 or SCSI interface, allow data to be transmitted between storage subsystems without the intervention of the host system.

The communication channels have inherent limitations on the rate at which data can be transmitted. Compressing the data decreases the size of the data stream being transferred which increases the band width of the data transmission between the host and storage subsystems. For a 3:1 compression ratio, data can be transmitted three times as fast over the same communication link. Control units can compress data before transmitting the data to the external storage device in order to transmit data quicker and to store more data on the device.

In Extended Distance Dual Copy, where data is sent from a primary control unit to a remote control unit for storage on a remote DASD, the data is typically stored on the primary DASD in a compressed form. The data is decompressed by a compressor before it is sent over a data channel to the remote control unit. The controller for the remote DASD has a compressor which again compresses the data before it is stored on the remote DASD.

In the dump/restore function, the data that was stored in a compressed form on the DASD is decompressed by the compressor and sent over the data channel to a remote control unit where it is again compressed by a compressor to be stored on the tape.

In an example where there is a three-to-one compression ratio, a 4.5 kilobyte record is compressed to 1.5 kilobytes. The difference between sending across 4.5 Kb versus 1.5 Kb can make a major difference in terms of the number of hours of data transmissions being sent. If the channel provides a transmission rate of 20 megabyte per second, a 4.5 Kb record of data would take 225 microseconds, whereas reducing the data size to 1.5 Kb would take 75 microseconds to transfer the data.

A compression algorithm is applied against a data record received from the host. If the compression algorithm results in a smaller sized record than the original record, the record is said to be compressed. If the compression algorithm results in a larger sized record then the original record, the record is said to be expanded. The preferred implementation is to discard the expanded records and use the original record. See co-pending commonly assigned patent application to Carreiro et al. which carries U.S. Ser. No. 08/322,441, filed Oct. 4, 1994, entitled Storage Management of Data Expansion Transparent to Host for a description of how the original record is used.

Storage subsystems do not currently utilize an efficient scheme for transmitting data streams of compressed and non-compressed data between the control units. The control unit needs to be able to identify whether the data it is receiving has already been compressed.

Compression of data streams is particularly significant for variable length records such as the IBM CKD format. However, other record formats can also benefit from compression.

A data stream which contains meta-data is defined to be a Composite Data Stream (CDS). Meta-data is used to describe records where compression may have been applied. A data stream which contains no meta-data generated by a storage unit is defined as an Original Data Stream (ODS). A data stream originating from a host system can also be referred to as an original data stream. When a CDS contains compressed records, it can be transferred in less time than its counterpart larger ODS. When there are both compressed and non-compressed data within the same data stream, transferring the data stream becomes more complicated. There is a need for the control unit to identify which records are compressed and a need to be able to de-compress records that have been compressed. There are special problems in identifying and sharing data streams which contain both compressed and non-compressed data records.

There is a need to be able to improve the performance when transferring data from a primary storage device to secondary storage devices by enabling data to be transmitted in a compressed form between control units.

SUMMARY OF THE INVENTION

The present invention alleviates the time consumption problems when transferring data between control units by enabling control units to identify and share composite data streams.

It is an object of the present invention to provide an efficient scheme for transmitting data to a backup device without having to decompress the data stream prior to transmission.

It is a further object of the invention to enable the primary control unit to read back the data from the backup device still in compressed format and reload it to the primary device without having to decompress the stream during a subsequent restore operation.

More particularly, it is an object of this invention to provide a system which can transfer and receive composite data streams of compressed and non-compressed data.

A method is provided for sending a data stream between a first data storage system in communication with a second data storage system. Meta-data is associated with each record of the data stream. The meta-data for each data record is updated to indicate whether or not the record has been compressed. The data records with the updated meta-data is sent to the second storage system. The meta-data and the data records are stored on a storage device at the second data storage system.

BRIEF DESCRIPTION OF THE DRAWINGS

FIG. 4 is a table of byte descriptions in a Record Description Element control blocks;

DESCRIPTION OF THE PREFERRED EMBODIMENT OF THE INVENTION

Figure 1:
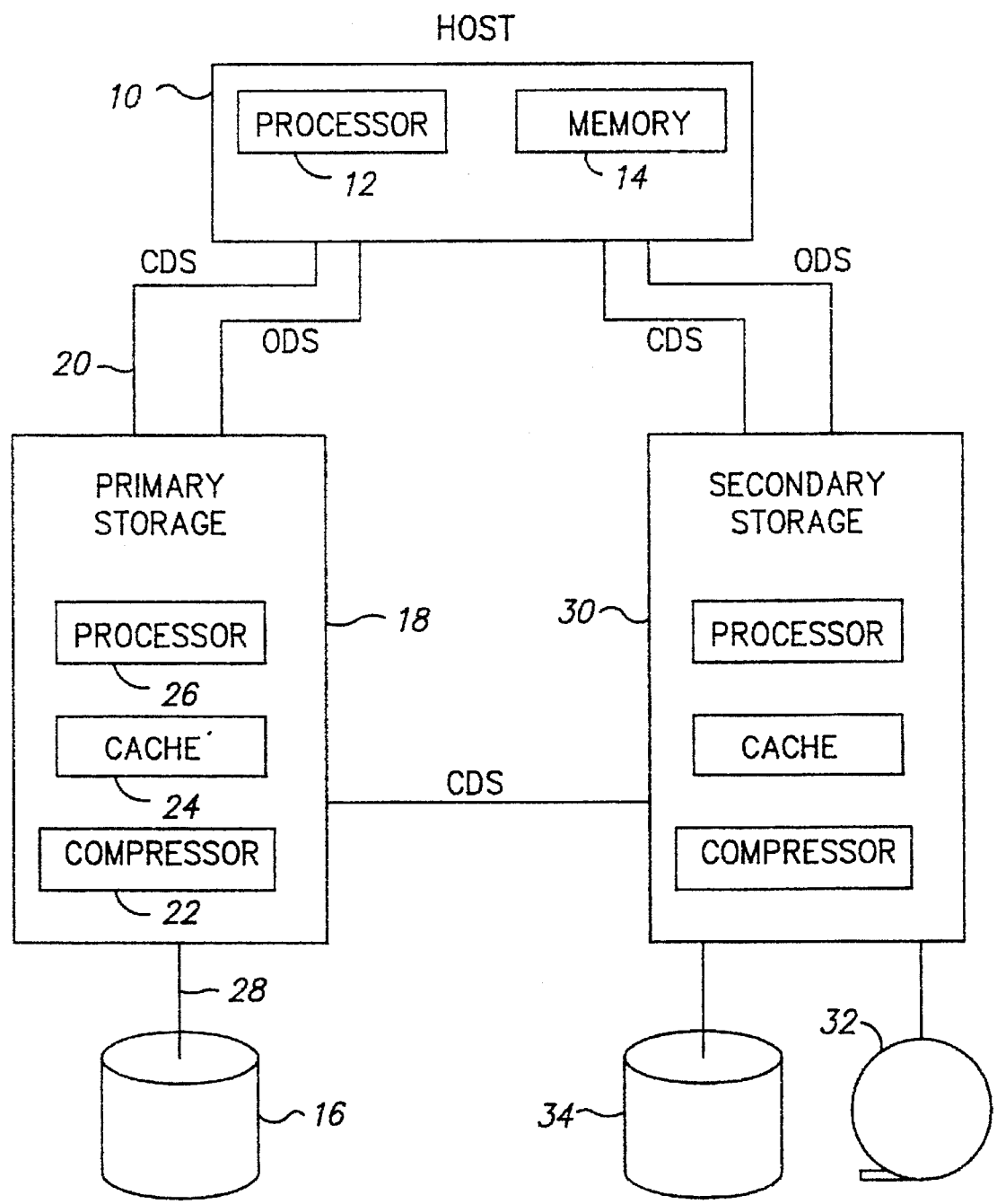
FIG. 1 is a block diagram overview of a storage system topology incorporating the present invention.

Referring to FIG. 1, in a backup operation, a host central processing unit (CPU) 10 comprising a processor 12 and memory 14 transfers a stream of data records to disk drives 16 which are controlled by control unit (also referred to as a storage unit) 18. An original data stream (ODS) is sent through channel interface 20 to primary controller 18. The controller 18 contains a data compressor 22, a cache 24, and a processor 26.

Data transferred over the link 28 as a composite data stream (CDS) is comprised of compressed and original data records.

When the host 10 requests the retrieval of an ODS from the storage device, the control unit 18 retrieves the record from the DASD. If the data are compressed the compressor 22 decompresses the data and sends it back to the host 10 in a non-compressed form.

Data is periodically backed up from the primary storage DASD to a secondary control unit 30. The control unit can be a controller for a tape device 32 or another DASD 34 as a dump/restore operation or a remote dual copy operation.

The diagram in FIG. 1 is illustrative of the system. The DASD 16 could be arrays of DASD and in general represent multiple DASDs. Similarly, the tape device can refer to multiple magnetic or optical tape systems or other mass data storage systems.

There are two categories of storage units which can accommodate a transference of a composite data stream. In the first category are storage units that identify and react to the composite data stream. In the second category are storage units that do not recognize the composite data stream structure, but, do not disturb it. A tape unit is an example which accepts and transmits a composite data stream without interference. Storage units in the first category, such as disk control units, at a minimum recognize the data stream as a composite data stream. Some storage units in the first category also have the ability to make the necessary transformation between original and composite data streams.

There are many scenarios illustrated in FIG. 1 in which data is transferred between the host 10, primary control unit 18 and the secondary DASD control unit or the tape unit 30. Data channels connect the host to the secondary storage unit and connect the storage units to each other.

In a first scenario, ODS is sent from the host 10 to the primary storage unit 18 and ODS is returned to the host 10. This is a normal Write and Read operation between a host and a control unit.

A second scenario is where ODS is sent from the host 10 to the primary storage unit 18. CDS is returned to the host. CDS is then sent from the host 10 to secondary storage unit 30 where there is no transformation made by the host. The secondary storage unit is not informed that CDS is transmitted. The secondary storage unit 30 is considered a category two storage unit. This is an example of a tape dump operation. To perform a restore operation, CDS is returned from secondary storage 30 to the host 10 without transformation. CDS is then sent from the host 10 to primary storage 18.

A third scenario is where ODS is sent from the host to primary storage, CDS is returned to the host, and CDS is sent from the host to secondary storage. This is an example of a Host assisted remote copy operation. The host 10 and secondary storage unit both behave as category one storage units. In this case the host has the option of retrieving the ODS from either the primary or secondary storage unit. That is, both the primary and secondary storage units can convert the CDS into ODS for transmission to the host as a standard read operation.

In a fourth scenario, ODS is sent from the host 10 to primary storage 18. CDS is sent from the primary storage 18 to secondary storage 30. This is an example of a non-host assisted backup copy operation.

Using this invention these scenarios require less time to complete then systems not implementing this invention because the transfer time for the CDS is less than it would be for the transfer of an ODS.

Figure 2:
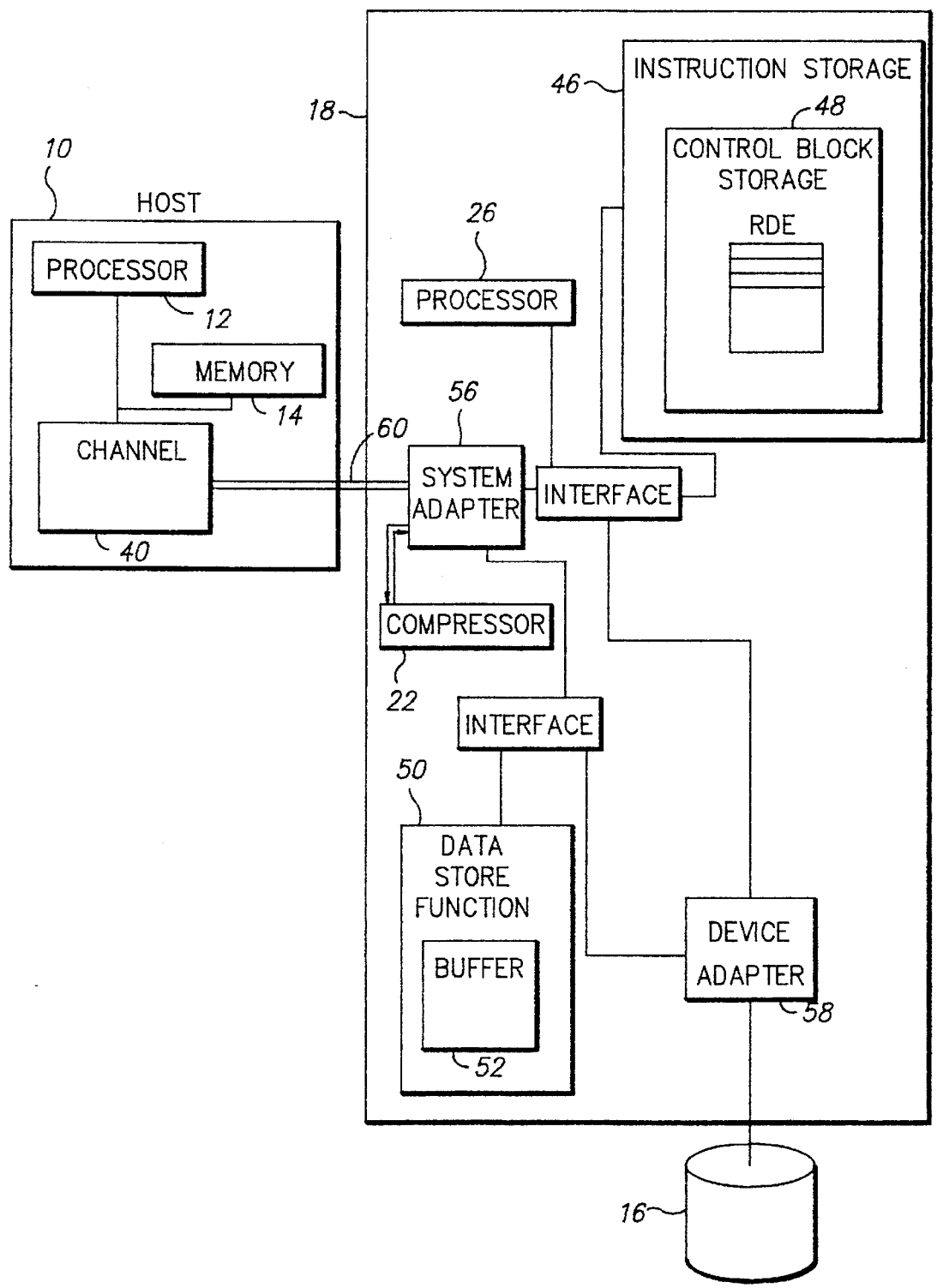
FIG. 2 is a high level block diagram of a host and a control unit.

Further details of the operation of the host 10 and control unit 18 are shown is FIG. 2. The host system as is well known has a processor 12 and memory 14 and a channel function 40. The memory 14 contain the data records to be sent out to the external storage device 16. The processor instructs the channel to move data between memory 14 and external storage 16.

The storage control unit 18 comprises a processor 26 which controls the overall operations of the control unit. An instruction storage area 46 includes a control block storage area 48. A data store area 50 includes buffers 52 for storing data before transference to the external storage 16. The control unit also comprises a compressor 22 which compresses the data and a device adaptor (DA) 58 which controls the external storage 16. A system adaptor (SA) 56 provides the logical connection between the internal protocols of the storage unit 18 and the external communication protocols of the channel interface 60. The data channel interface 60 connects the host channel function 40 to the system adaptor 56. The system adaptor also manages the interface to the data store 50, to the compressor 22 and to instruction storage 46. As illustrated, data buses interconnect the components within the host and control units.

While the preferred embodiment will now be described with particular reference to CKD format records, it is understood by those skilled in the art that this invention is not limited to the CKD format. Rather, any record format, whether fixed blocks or variable length, can be optionally compressed and transferred between storage units as part of composite data streams.

The control block of particular interest in the present invention will be referred to as a record descriptor element (RDE). The RDE contains the count field data, a compressed data field length, a pointer to the buffer 52 where the data is stored, flags and a count field length. The RDE provides the meta-data used in identifying and processing records in a composite data stream (CDS). Records in a CDS have meta-data stored as part of the record providing the information for the RDE. The meta-data is stored in record as an expanded count field. Records with expanded count fields are referred to as expanded count records (ECRs).

A CDS data transfer operation can also be referred to as an expanded count transfers. An expanded count transfer includes the movement of one or more expanded count records (ECRs).

A category one storage unit creates an RDE for each ODS write operation involving a count field. (These are format write commands such as Write Count Key Data (WCKD) and Write Track (WT)). A category one storage unit will update the RDE for each record for all other ODS write operations. The category one storage unit is notified of a CDS transfer via unique commands. In the preferred embodiment, these commands are defined as Write Expanded Count Key Data (WXCKD), Write Expanded Track (WXT), Read Expanded Count Key Data (RXCKD), and Read Expanded Track (RXT). WXCKD and WXT signal a write while RXCKD and RXT signal a read of CDS data. WXCKD and RXCKD transfer a CDS containing a single record. WXT and RXT transfer a CDS containing one or more records.

Category two storage units transfer CDS and ODS data, but, are unaware of the format of the data. These commands are defined as Reads and Writes as issued to a tape storage unit.

Figure 3:
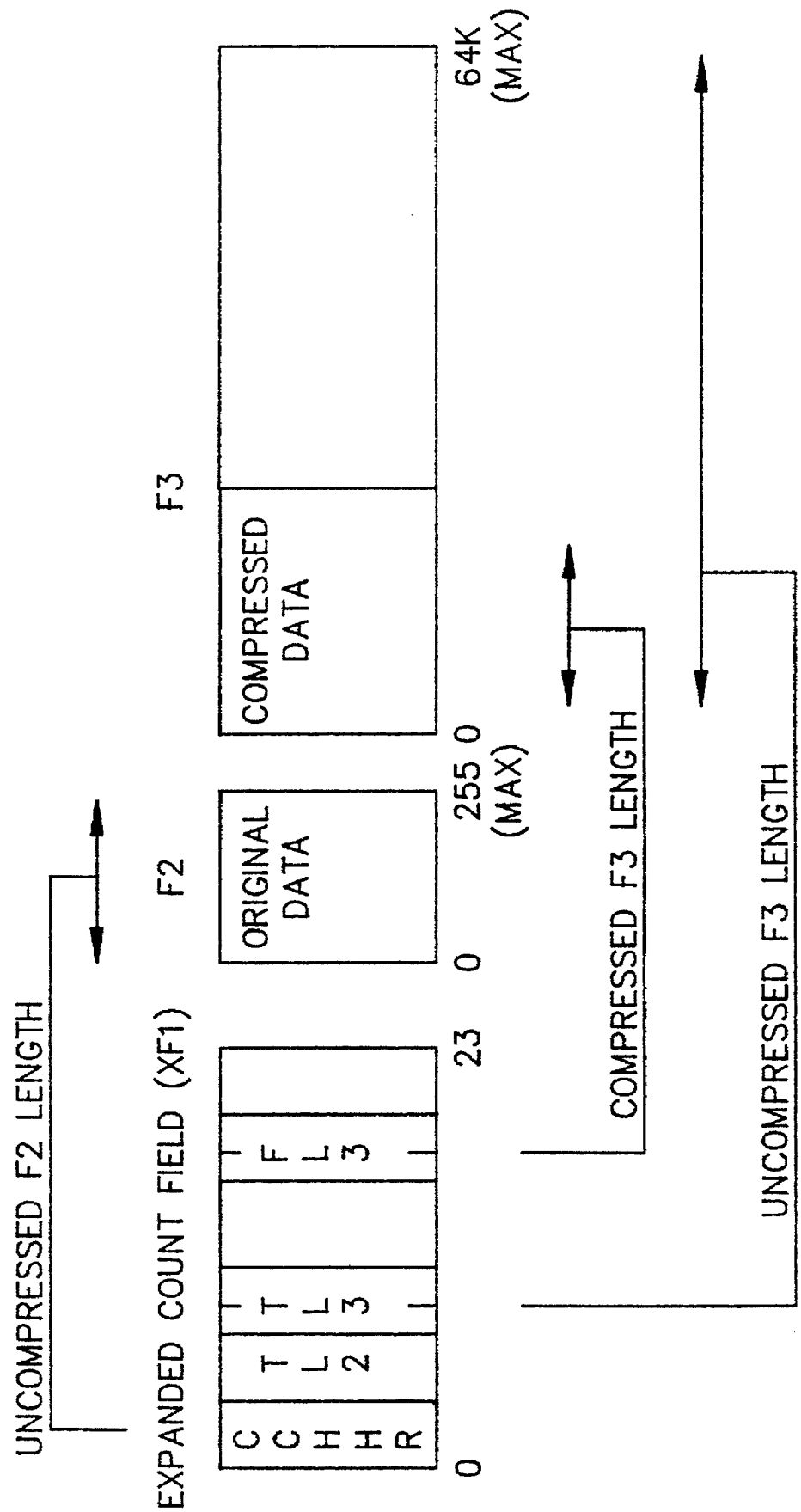
FIG. 3 is a diagram of a record format according to the present invention.

Each ECR contains one control field (with meta-data describing the ECR), and 0, 1 or 2 additional fields (in compressed or non-compressed format). FIG. 3 provides a schematic diagram of the preferred embodiment of an expanded count record format. The first field of an ECR is the expanded count field (XF1) which contains the meta-data associated with the subsequent data fields (F2 and F3). FIG. 4 provides a detailed illustration of the preferred embodiment of the byte content of the expanded count field (XF1) as stored as the first 24 bytes in the RDE. F2 is the key field and F3 is the data field as in a CKD format record. In the preferred embodiment, the Expanded Count Field (XF1) is 24 bytes long and contains data (in addition to the location of record on the storage device) which indicates whether the contents of F3 is compressed, the uncompressed lengths for F2 and F3 and the compressed length for F3. While this embodiment shows only Field 3 compression, the key field can also be compressed under this architectural scheme.

The RDE as shown in FIG. 4 and as will later be described in greater detail, has several fields. The first 23 bytes of the expanded count field are transferred to the expanded count field (XF1). The transfer_length_1 field is used to determine the number of bytes to be transferred for the count field. The data buffer address provides the address where the data is stored in the buffer.

Write Operations

Write operations are characterized as having a storage unit as the recipient of the data stream. Normal Write operations transfer an ODS. Expanded count write operations transfer a CDS. The following sections describe a category one storage unit behavior for transferring an ODS and a CDS.

A single RDE is used for all write operations involving a single record. Multiple record transfers use one RDE per record. The count field for all format write operations is transferred from the host and saved in designated bytes of the RDE.

For ODS write operations, transfer_length_1 field is set to 0 bytes if no count field is transferred and set to a standard 8 bytes if a count field is transferred. As described previously, the standard 8 byte count field contains information on the cylinder, head, record location, key field size and the non-compressed data field size. In the preferred embodiment, for Write operations involving CDS, transfer_length_1 is set to 24 (which is the size of the expanded count field in the preferred embodiment).

A flag stored in a control block (not shown) called the enable_expanded_count_transfer flag is set to 0 for all write operations other than Expanded Format Write operations.

For ODS write operations involving a count field, software sets transfer_length_1=8. Setting transfer_length_1 to non-zero transfers Field 1 into the RDE. RDE bytes 0–7 are undefined until the field 1 transfer has been completed. transfer_length_2 is the key length (KL) field of the original (non-compressed) key field. RDE transfer_length_3 is the data length (DLDL) field of the original (non-compressed) data field. These values are provided by the host in an ODS format write operation as part of the ODS record count field.

For expanded write operations, transfer_length_1=24. (Expanded write operations always transfer the count field). transfer_length_2 is the KL (key length) field of the original (non-compressed) Key Field. Transfer_length_3 is the DLDL (data length) field of the original (non-compressed) data field. These RDE fields and additional fields defined in the 24 byte expanded count field transfer are not valid until the count field transfer has been completed. At this time, the enable_expanded_count_transfer flag is set to 1.

The following is a description of the process of receiving an ODS of CKD format records and creating the ECRs for the CDS. The CDS will contain both compressed and non-compressed data records. Both types of records are still ECRs in the CDS. That is, they have the expanded count field included in the record. The storage unit receives a WCKD command which indicates that CKD format records (not ECRs) will be sent by the host. The storage unit then proceeds to create the ECRs, as described below.

A flag called an Enable_Write_Compression stored in a control block (not shown) is initialized to enable compression mode for the data field in the CKD record, when compression is desired.

Initially the transfer_length_1 field is set to 8. Field_Descriptor_3_Flags.Compressed_Field is set to one to indicate compression or set to zero to indicate no compression of the data field. The count field is transferred and loaded into the RDE. The following RDE fields are updated:

transfer_length_2=KL (the length of the key field)

transfer_length_3=DLDL (the length of the non-compressed data field field_2_length=transfer_length_2 field_3_length is set to one of two possible values: it is set to DLDL if compression is not required and set to zero if compression is required If the count field parameter KL=0 then field_2_length is not used but is updated to zero.

If the count field parameter DLDL=0 then field_3_length is not used but is updated to zero.

The key and data fields are transferred if their length is non zero. If DLDL is not zero and compression is required then Field_3_Length is set to the compressed length (CLCL) once the compressed length is determined.

When the transfer has completed (including all compressor operations) normal status is presented (or appropriate error status if an error occurred). Detection of an error condition will cause an appropriate error status to be generated and the transfer will be terminated.

Figure 5:
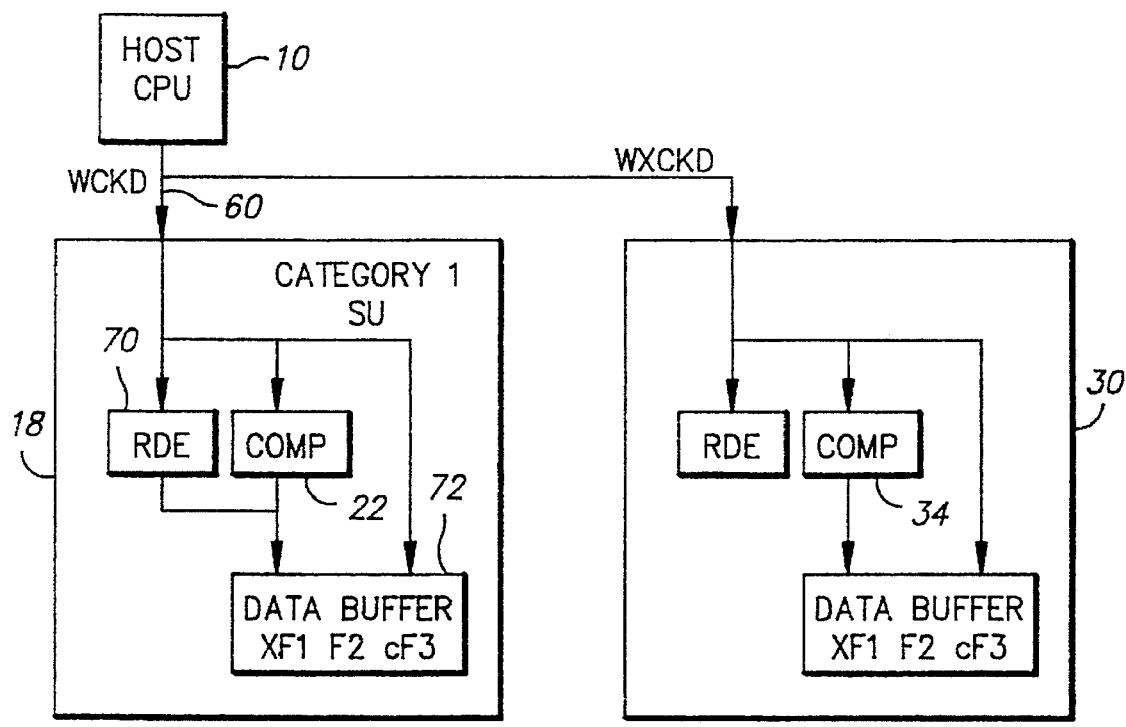
FIG. 5 is a block diagram of the interaction between a host and a control unit during a write operation implementing the present invention.

The operation for receiving the ODS and writing ECRs is summarized with reference to FIG. 5, as follows. The write count key data record command (WCKD) is issued by the host 10 to the primary control unit 18. The ODS data from the host 10 is sent to the storage unit 18 through the channel 60. Each record in the ODS has a standard 8-byte count field. The count field is used to construct part of the RDE 70 (the first 8 bytes of the RDE are the count field). The record can be compressed by compressor 22 and stored in a data buffer.

The RDE meta-data is updated to indicate the length of the data field. Other flags are updated (as described below) to reflect the status of the record. The first 24 bytes of the RDE provide the 24 bytes for the expanded count field XF1. The RDE also contains the data buffer address for the data. The expanded count field record, including the expanded count field XF1, key field F2 and data field F3 or compressed data field CF3, is stored in a buffer 72 waiting to be stored on disk or transferred to secondary storage devices as part of a CDS.

The following is a description of the expanded write operations between control units for a dump operation or a dual copy operation. The description is in reference to FIG. 5 which shows a host assisted operation. The description applies as well to non-host assisted operations, as is readily understandable to those skilled in the art.

The secondary control unit 30 receives the commands WXCKD and sets up an RDE 70 control block. The first 24 bytes of the data received from the link are stored into the corresponding bytes of the RDE 70. If the Field_2_Length (in the RDE) is non-zero, then the number of bytes indicated in the Field_2_Length are read in from the host 10 as the key field (F2) and stored in the data buffer 72.

If the Field_3_Length is non-zero, then the number of bytes indicated in the Field_3_Length are read in from the host and stored in the data buffer 72. The first 24 bytes of the RDE are then stored in the data buffer (XF1).

A category two storage unit receives data from the link and transmits it to the storage device or to another storage unit as a continuous stream of data.

Read Operations

Figure 6:
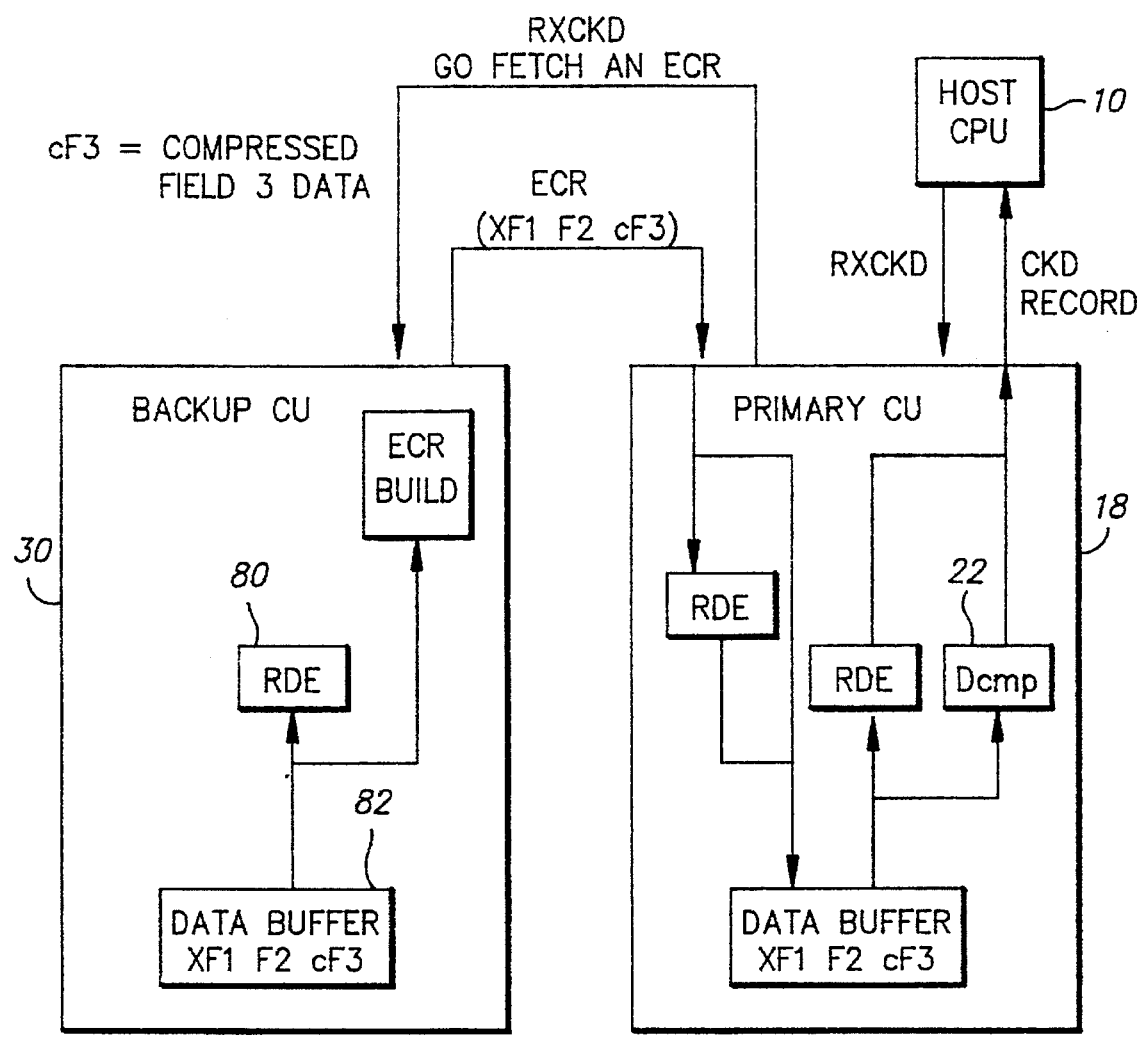
FIG. 6 is a block diagram of the interaction between a host and a control unit during a read operation implementing the present invention.

Read operations are characterized as having a storage unit as the source of the data stream. Normal read operations transfer ODS. Expanded count read operations transfer CDS. The following sections describe a Category One Storage Unit with reference to FIG. 6.

A single RDE 80 is used for each record in a read operation. The ECR, including the expanded count field XF1, the key field F2 and the data field F3, is stored in a data buffer 82. On receipt of the RXCKD command, the storage unit 30 retrieves the ECR, builds the RDE and sends the ECR to the requesting storage unit 18. The host can read data from either the primary or secondary storage unit.

The count fields for all read operations are transferred from the RDE for the record as stored in the storage area of the control unit. For read operations involving an ODS transfer to the host, transfer_length_1 field is set to 0 if no count field is to be transferred and set to 8 for a transfer of a Count Field. For Read operations between storage systems involving CDS (including host assisted operations between storage systems), transfer_length_1 is set to 24.

The values for the transfer_length_1, transfer_length_2, and transfer_length_3 for ODS and CDS are similar as described for the write operations.

The RDE parameters indicate the state of the record in the subsystem. If field 3 exists then the Field_Descriptor_3_Flags.Compressed_Field value indicates if the field is compressed or not.

In an ODS transfer to the host, the first 8 bytes of the RDE are transferred as the Count Field (TL_1=8). If the KL transfer_length_2 is not zero, then field 2 is also transferred. If KL is zero, then field 2 is skipped. If DLDL transfer_length_3 is not zero, then field 3 (non-compressed) is also transferred. When field 3 is a compressed field, field 3 will be decompressed and then transferred. If DLDL is zero, then field 3 is skipped. For CDS transfers, the first 24 bytes of the RDE are transferred as the expanded count field, field 2 is transferred if Field 2 Length is non-zero, and field 3 is transferred if Field 3 Length is non-zero.

For a CDS transfer, field 3 is not decompressed. The first 24 bytes of the RDE are transferred as the expanded count field (TL-1=24).

When the transfer has been completed (including all decompressor operations), the status will be presented.

Transfer Commands

A storage unit which receives an Original Data Stream (ODS) will build an internal control block known as an RDE. A Category One storage unit which receives a Composite Data Stream (CDS) will store the ECR XF1 into a RDE without modification. A Category One storage unit transmitting a CDS uses the RDE to transmit the ODS containing the ECR(s). A category two storage unit treats all transfers as an ODS transfer and may or may not use an RDE for the transfer. A storage unit may be a category one or a category two storage unit depending upon the operation being executed at any time.

Note that the detailed signalling protocol between the units are not part of this invention, and in any case would be dependent on the communication link between the two storage units.

An expanded format write command WXCKD indicates to a storage unit that a CDS containing an ECR is about to be transferred to this storage unit.

Multiple record transfers are handled in the same way with an RDE for each record.

Hardware Description

Figure 7:
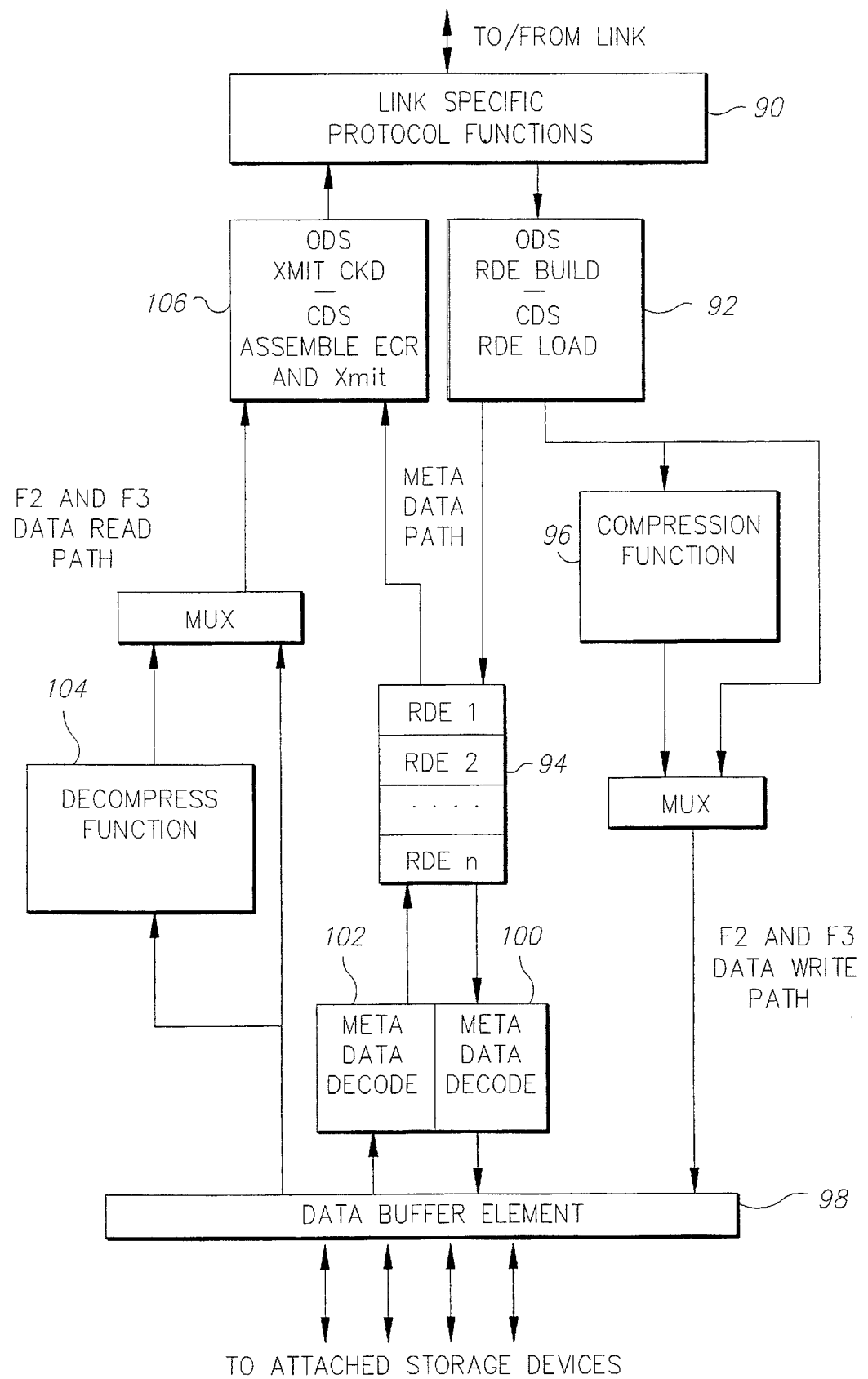
FIG. 7 is a block diagram of the control unit hardware functions during read and write operations implementing the present invention.
Figure 8:
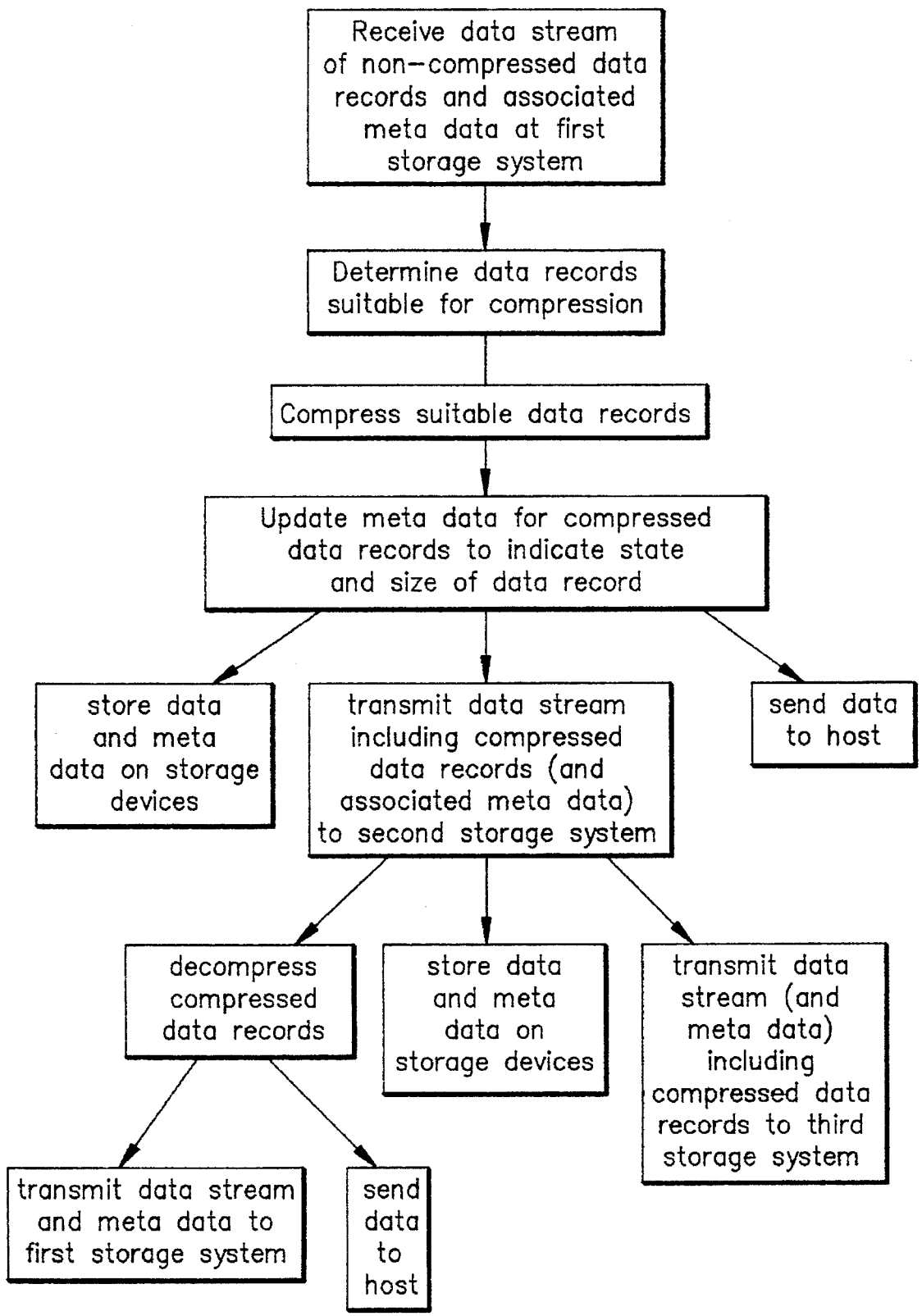
FIG. 8 is a flowchart of the process for transferring a data stream having compressed and non-compressed data records between two control units.

Referring to FIG. 7, the sub-components of the storage unit hardware are shown. Link specific protocol functions 90 provide the interface between the storage units and the host for transmission of the data records in the data stream. In an expanded count record write operation, a RDE control block for the record is built 92. The data in the record count field provides the data for some fields in the RDE. The RDE for each record is stored in the control block storage area 94.

For ODS transfers the data field can be compressed by the compression function 96. The RDE for the record is updated with the data from the compression operation. The data field or compressed data field (key field when used) and count field are stored in the data buffer element 98. The meta-data from the RDE is used to encode the expanded count field 100 which is also stored in the data buffer element 98. The data buffer element interfaces with the attached storage device for storage of the ECR on these devices.

When reading the ECR from the buffer 98, the meta-data is decoded 102 to provide the information for the RDE. The data field can be decompressed by the decompress function 104. The standard count field is extracted from the RDE and combined with the key and data fields at 106 for transmission back to the host as a standard CKD format record.

RDE Description

Referring to FIG. 4, the RDE will be described in greater detail. The Count_Field_CCHHR field contains the first 5 bytes of the field 1 transfer. This is typically in the form of two byte cylinder address (CC), two byte head address (HH) and one byte record address (R). During write operations of ODS, field 1 is provided from the host as the first 8 bytes received from the interface. Hardware stores these bytes in the RDE. The count_field_KL/transfer_length_2 field (abbreviated TL_2) defines the length of the data to be transferred for field 2 transfers. This is typically the key field of a CKD record. During operations transferring field 1, this field is loaded by hardware with the sixth byte received from the interface.

Transfer_length_2 is used to determine whether or not to transfer a key field (field 2). A zero value in transfer_length_2 indicates no field 2 transfer is requested. A non-zero value transfer_length_2 indicates a field 2 transfer is requested.

At the normal completion of the field 2 transfer (or no transfer) hardware will proceed to operate on field 3.

The count_field_DLDL/transfer_length_3 field (abbreviated TL_3) defines the length of the data in an ODS to be transferred for field 3 transfers. This is typically used to transfer the Data field of CKD record and is also used to transfer command parameters and sense data. During operations transferring field 1, this is the seventh and eighth bytes received from the interface. This field is used to determine whether or not hardware is to transfer a field 3. A zero value in transfer_length_3 indicates no field 3 transfer is requested. A non-zero value transfer_length_3 indicates a field 3 transfer is requested.

The transfer_length_1 field is 8 bits, the transfer_length_2 field is 8 bits and the transfer_length_3 field is 16 bits in length.

The RDE Field_Descriptor_n_Flags (n=1, 2 or 3) fields contain the Field_Descriptor_Flags corresponding to Field_n of the RDE (abbreviated to FD_n_Flags). Field_Descriptor_n_Flags contains multiple subfields not shown. Subfield Compressed_Field, is used to indicate whether the data field is compressed.

Field_n_Length (n=2 or 3) fields contain the length of the field to be transferred to the data buffer. For Write operations if Enable_Expanded_Count_transfer is set to 1, then Field_3_Length is used to transfer data in the interface.

Field_2_Length and Field_3_Length are updated by Hardware for Write operations. Software does not write into either of these two fields for Write operations. Hardware writes 0's into any Field_n_Length (n=2 or 3) which are not transferred.

For write operations, if enable_expanded_count_transfer is set to 0 and field_3 is uncompressed, then hardware loads the field 3 length with contents of the uncompressed length (TL_3/DLDL).

For write operations, if enable_expanded_count_transfer is set to 0 and field_3 is compressed, then field 3 length for a compressed field 3 may contain either a zero or non zero value. FD_Flags contain the indication of whether or not a field is compressed. Hardware the compressed length as the field_3_length at the normal completion of the write operation. field 3 compression is controlled by the setting of enable_write_compression (control block not shown), the setting of the FD_3_flag.compress_field, and the setting of enable_expanded_count_transfer.

For read operations, if enable_expanded_count_transfer is set to 1, then field_3_length specifies the amount of field three data to be transferred (if any) to the interface.

The transfer_length_1 field (abbreviated TL_1) defines the length of the data to be transferred for field 1 transfers. This field is set by Software and read by hardware, or this field has the value 8 bytes for the length of the count field of a CKD record, or 24 bytes for the length of the expanded count field for expanded count field transfers. Hardware uses transfer_length_1 to determine whether to transfer a field 1 and whether its an expanded count field. A zero value in transfer_length_1 indicates that Software is not requesting a field 1 transfer. A non-zero value transfer_length_1 indicates that software is requesting a field 1 transfer.

At the normal completion of the field 1 transfer (or no transfer) hardware will proceed to operate on field 2.

Bytes 28–31 contain the pointer to the data buffer where the data field (whether or not compressed) is stored.

For CDS read operations, The enable_expanded_count_ transfer (not shown) is used to control the transfer of expanded count fields. When set it uses the RDEs as processed by hardware during the write operation as follows: field_3_length is used for the transmission of data instead of the contents of transfer_length_3 for all records transferred on the interface. For CDS write operations, the enable_expanded_count_transfer bit is used to control the transfer of expanded count fields. When set to 1, it modifies all RDE processed by hardware as follows: disables compression; inhibits loading of field_3_length with the contents of RDE transfer_length_3. This maintains the compressed counts for compressed fields; and directs hardware to use the value contained in field_3_length instead of transfer_length_3 for control of data transfer on the interface. The field_3_length used was received into the RDE as part of the expanded count field transfer.

Operating System

The host computer maintains configuration data which uniquely identifies every storage unit and specifically every device unit address attached through the storage units. Additionally, configuration data exists at the host identifying the logical pathing and routing of interface data from the various host channels, to their set of attached devices.

In this invention, part of this configuration data is used to identify which storage units were primary storage units and devices, and which were secondary. For peer-to-peer transfers the primary storage unit and its associated device is notified as to which secondary storage unit and its associated device is to be used for backup and dual copy transfers. Once identified the primary storage unit will use this information to create a copy on the designated secondary device.

For host assisted transfers, simply identifying which storage units were primary and which were secondary is sufficient. For non-host assisted backup, the host notifies the primary of its secondary storage unit's address, and notifies the secondary storage unit of its nature as a backup.

Using the foregoing specifications, the invention may be implemented using standard programming and/or engineering techniques. The resulting program may be stored on memory cards RAM or other memory device for execution the program may be copied into the RAM of the system. One skilled in the art of computer science will easily be able to combine the software created as prescribed with the appropriate general purpose or special purpose computer hardware to create a computer system embodying the invention. While the preferred embodiment of the present invention has been illustrated in detail, it should be apparent to one skilled in the art that modifications and adaptations to that embodiment may occur without departing from the scope of the present invention as set forth in the following claims.

What is claimed is:

1. A method for sending a data stream of data records received from a host system between a first and second storage system in communication with each other and each storage system in communication with at least one host system, each storage system including a memory, a processor, at least one storage device, means for communicating with another storage system, means for storing data records on the included storage device and means for transferring a data stream to and from said host system, said method comprising the steps of:

(a) storing in said first storage system meta-data about each data record including whether a data record is compressed;

(b) compressing at said first storage system without assistance from the host system or the second storage system, at least one data record in the data stream, and updating the meta-data for a data record that has been compressed to indicate that the data record is compressed;

(c) sending the data stream with the meta-data from the first storage system to the second storage system;

(d) storing the meta-data and data stream on a storage device at the second storage system;

(e) reading the meta-data at the second storage system that at least one data record in the data stream has been compressed;

(f) storing as part of the meta-data the length of the data record when compressed and the length of the data record when non-compressed, and wherein both compressed and non-compressed data records are transmitted as part of the data stream; and (g) in response to a request from a host system to the second storage system for the data stream, the second storage system retrieving the data stream from the storage device, uncompressing any compressed records in the data stream without assistance from the host system or the first storage system, and sending the data stream of non-compressed data records to the requesting host system.

2. The method of claim 1 wherein the second storage system identifies the presence of a compressed record.

3. The method of claim 1 further comprising the step of the second storage system sending the data stream including a compressed data record to a third storage system having a storage device, where the third storage system is unaware of the presence of the compressed record and stores the data stream on a storage device controlled by the third storage system.

4. The method of claim 1 wherein a host system transfers data to the first storage subsystem in an non-compressed state.

5. A method for sending a data stream stored at a second storage system as provided in claim 1 to a third storage system comprising the further steps of:

(a) reading the data records from the storage device controlled by the second storage system;

(b) identifying from the meta data stored with the data records which records are compressed;

(c) decompressing any compressed records; and (d) sending the data records in a non-compressed state to the third storage system.

6. The method of claim 1, further comprising the steps of sending a data stream between a first and second storage systems wherein no data record in the data stream is compressed.

7. A system for sharing a data stream of data records between a first and second storage system in communication with each other and each storage system wherein both compressed and non-compressed data records are transmitted as part of the data stream in communication with at least one host system, each storage system including at least one storage device having a plurality of data records stored on the storage device, said system comprising:

means for associating with at least one data record stored on the first storage system a record length indicator;

compression means for compressing and decompressing at least one data record at the first storage system independent of the host system and the second storage system;

means for associating with a compressed data record stored on the first storage system a compressed data record length indicator;

means for sending the data stream including the compressed data record with the record length indicator and a compressed record length indicator from the first storage system to the second storage system;

means for storing the compressed data record and indicators on a storage device at the second storage subsystem;

means for retrieving a data record from a storage device at the second storage system;

means for identifying a compressed data record, at the second storage system independent of the first storage system and the host system means for decompressing the compressed data record at the second storage system independent of the first storage system and the host system; and means for sending a data stream to a requesting host system directly from the second storage system independent of the first storage system and the host system;

means for transferring the data stream from the second storage system to a third storage system wherein all data records in the data stream are in a non-compressed state, means for transferring a data record from the second storage system to the third storage subsystem in a compressed state wherein the third storage subsystem is unaware of the compressed state and stores the data record on a storage device controlled by the third storage system independent of the first and the second storage system and the host system.

* * * * *